United States Patent [19]

Perini et al.

[11] Patent Number: 4,805,287

[45] Date of Patent: Feb. 21, 1989

[54] PANEL JOINTING SYSTEM AND METHOD OF JOINING PANELS

[75] Inventors: Richard Perini, Kirribilli; Terry Costigan, Cambridge Park, both of Australia

[73] Assignee: Rilin Investments Pty. Limited, Rockdale, Australia

[21] Appl. No.: 39,624

[22] Filed: Apr. 16, 1987

[30] Foreign Application Priority Data

Apr. 16, 1986 [AU] Australia .............................. PH5500

[51] Int. Cl.$^4$ .............................................. B23Q 17/00

[52] U.S. Cl. ........................................ 29/407; 29/707; 29/709; 29/791; 156/304.5

[58] Field of Search ................. 29/407, 412, 707, 709, 29/791; 144/350, 352; 156/304.5, 517, 258

[56] References Cited

U.S. PATENT DOCUMENTS

| | | | |
|---|---|---|---|
| 1,396,971 | 11/1921 | Meyercord | 144/352 |
| 3,686,061 | 8/1972 | Brown et al. | 144/352 |

FOREIGN PATENT DOCUMENTS

| | | | |
|---|---|---|---|
| 1628977 | 2/1971 | Fed. Rep. of Germany | 156/304.5 |
| 7903846 | 11/1980 | Netherlands | 144/350 |

*Primary Examiner*—Timothy V. Eley

*Attorney, Agent, or Firm*—Ladas & Parry

[57] ABSTRACT

A method and apparatus for joining panels, which panels have bevelled trailing and leading edge faces, the apparatus and method abut the trailing and leading edge faces of adjacent panels and secure them together by means of an adhesive and the application of a force to the scarf joint.

7 Claims, 2 Drawing Sheets

PANEL JOINTING SYSTEM AND METHOD OF JOINING PANELS

BACKGROUND OF THE INVENTION

This invention relates to the joining of sheets or panels formed of wood, wood particles or wood fibres (hereafter referred to as panels). Such panels are manufactured in various sizes, the most common in use in Australia measures 5.5×1.4 meters. Such panels are extensively used in the building and manufacturing industry and when so used such panels have to be frequently cut to a particular size and in consequence there is, in many cases, considerable wastage of material because of such off-cuts.

SUMMARY OF THE INVENTION

In the manufacture of certain types of doors such panels are used to form the outer skin of both major faces of the door and because of the size of such doors as compared with standard size panels there is considerable wastage as a result of off-cuts which cannot be used to fabricate normal size doors.

Wastage of the type referred to amounts to many thousands of square metres annually and is a very significant factor in manufacturing costs. In consequence a considerable saving would be possible if an economical means could be found whereby off-cits of such panels could be economically joined to form panels of a usable size.

There is disclosed herein a method of joining panels including the steps of:

providing a plurality of panels, with each panel having a pair of parallel bevelled edge faces, said edge faces intersecting the major surfaces of the panel, at a predetermined acute angle, so as to provide two generally parallel edges, and at a predetermined obtuse angle, so as to provide two generally parallel ridges;

applying adhesive to the edge faces;

moving the panels successively along a predetermined path with the edge faces transverse of said path, so that adjacent edge faces of an adjacent leading and trailing panel are parallel and facing in opposite directions;

measuring the thickness of the leading panel and providing a signal indicative thereof;

using said signal to compute the position of the trailing ridge of the leading panel relative to its trailing edge;

locating the trailing ridge of the leading panel at a predetermined position by positioning the trailing edge of the leading panel;

applying a clamping force to said leading panel at or adjacent the trailing ridge thereof when at said predetermined position; and moving said trailing panel into contact with said leading panel while being subjected to said clamping force, to abut the leading face of the trailing panel with the trailing face of the leading panel so as to secure the abutted faces together.

There is further disclosed herein an apparatus to join panels, with each panel having a pair of parallel bevelled edge faces, said edge faces intersecting the major surfaces of the panel at a predetermined acute angle, so as to provide two generally parallel edges, and at a predetermined obtuse angle, so as to provide two generally parallel ridges, said apparatus comprising:

means to apply adhesive to the edge faces;

means to move the panels successive along a predetermined path with the edge faces transverse of said path, so that adjacent edge faces of an adjacent leading and trailing panel are parallel and facing in opposite directions;

means to measure the thickness of the leading panel and to provide a signal indicative of said thickness;

means to receive said signal and to compute the position of the trailing ridge of the leading panel relative to its trailing edge;

means to locate the trailing edge of the leading panel at a predetermined position by positioning the trailing edge of the leading panel;

means to apply a clamping force to said leading panel at or adjacent the leading ridge thereof when at said predetermined position;

means to move the trailing panel into contact with said leading panel while being subjected to said clamping force, to abut the leading face of the trailing panel with the trailing face of the leading panel so as to secure the abutted faces together.

A preferred form of the present invention will now be described by way of example with reference to the accompanying drawings, wherein.

DESCRIPTION OF THE PREFERRED EMBODIMENTS

Figure 1:
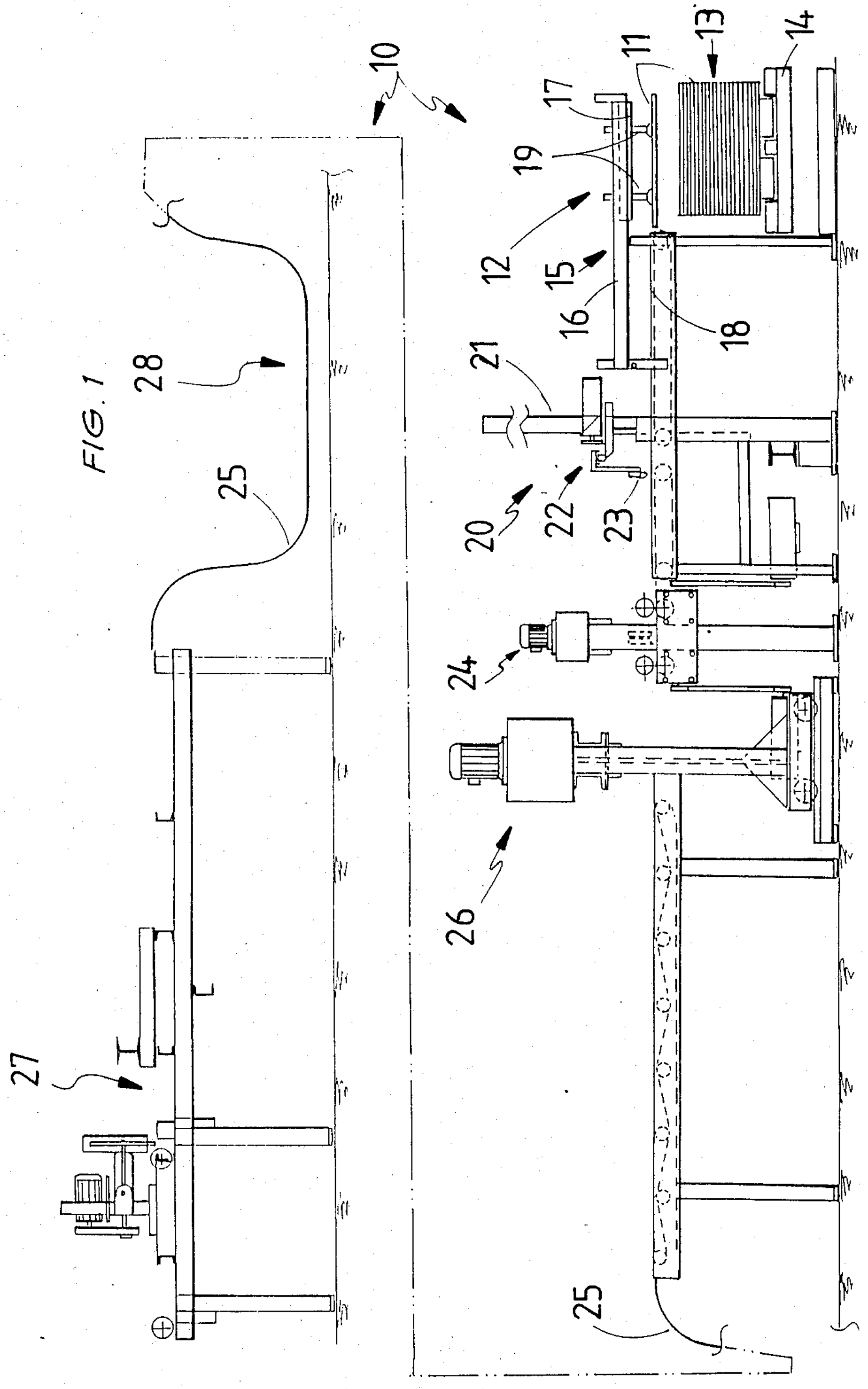
FIG. 1 is a schematic side elevation of an apparatus to join generally rectangular panels.

In FIG. 1 there is schematically depicted an apparatus 10 to join rectangular panels or sheets 11. In this particular instance, the panels 11 are compressed particle board or sheets.

The apparatus 10 has a receiving work station 12 whereat a stack 13 of the panel 11 is located. The stack 13 is received on a platform 14 which is gradually elevated to locate the top panel 11 at a position whereat it can be picked up by a transfer mechanism 15. The transfer mechanism 15 includes a support frame 16 upon which there is mounted a carriage 17 which is reciprocated between a position above the stack 13, and a position above the conveyor 18. Attached to the carriage 17 are suction members 19 which are operated to grip the top sheet 11 of the stack 13 and deposit the sheet 11 on the conveyor 18.

Positioned adjacent the conveyor 18 is an adhesive applicator assembly 20 including a support frame 21. Movably mounted on the frame 21 is a carriage 22 supporting an applicator head 23. The applicator head 23 is reciprocally movable across the conveyor 18 so as to apply glue to the appropriate surface of each panel 11 as it passes thereby. It should be appreciated that the conveyor 18 is intermittently operated so that movement only takes place when adhesive is not being applied to the panel 11 located adjacent the applicator head 23.

The panels 11 are sequentially delivered to a clamp assembly 24 wherein each leading panel 11A is joined to its subsequent trailing panel 11B. The continuous strip 25 so formed, then passes a further clamp assembly 26. If so desired thickness differences between adjacent panels 11 is overcome by machining adjacent the joins to smooth out the junction between adjacent panels 11.

The strip 25 then passes to a cutting station 27 wherein the strip is cut to form discrete lengths.

Since the panels 11 are sequentially moved to the clamping assembly 24, the strip 25 undergoes intermittent movement. To accommodate this intermittent movement, the strip 25 is allowed to form a trough 28. From this trough 28, the strip 25 is moved a predetermined distance to correspond to the predetermined lengths to be severed from the strip 25 at the cutting station 27.

In devising the above apparatus 10, considerable difficulty was encountered in successsfully joining successive panels 11. It was determined the most successful method of joining the panels was to chamfer the leading and trailing edges.

Figure 2:
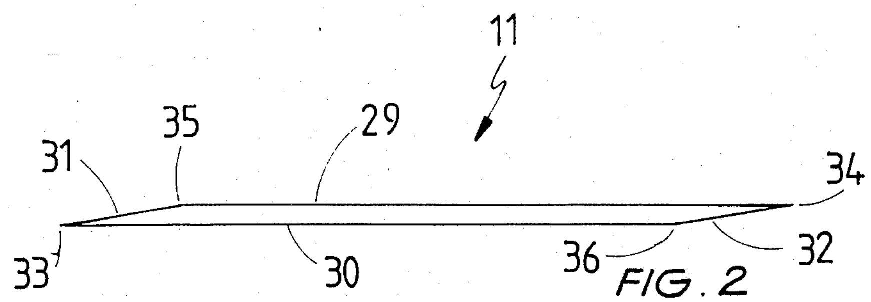
FIG. 2 is a schematic side elevation of one of the panels used by the machine of FIG. 1.
Figure 3:
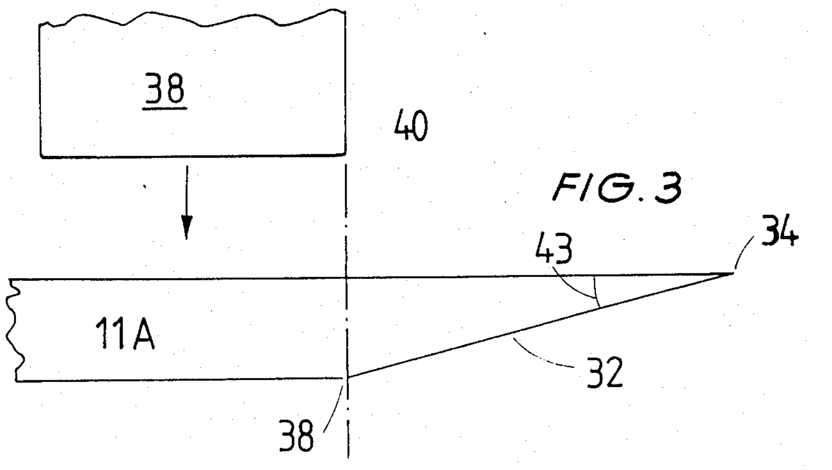
FIG. 3 is a schematic side elevation of a clamp and panel portion.
Figure 4:
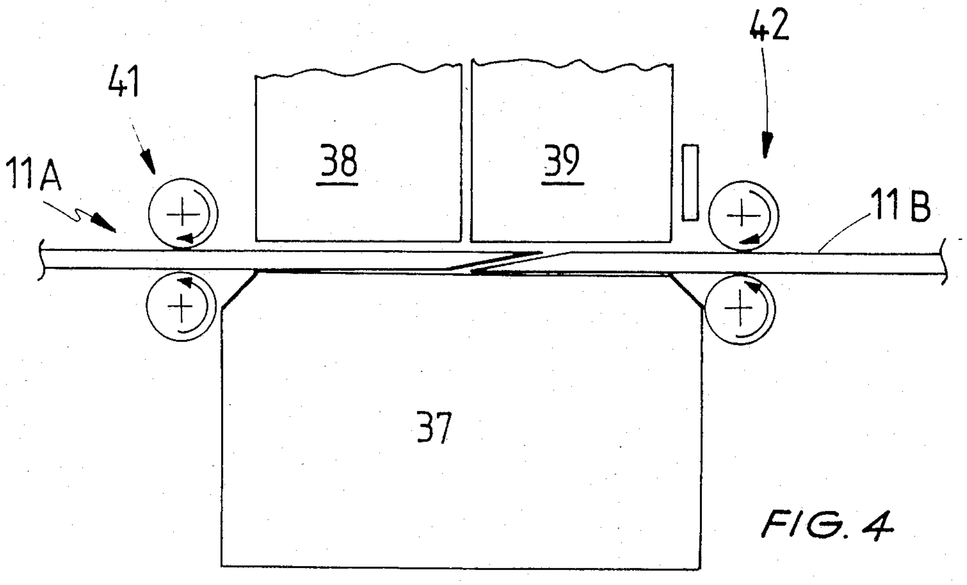
FIG. 4 is a schematic side elevation of the clamp assembly employed in the apparatus of FIG. 1.

In FIG. 2 there is schematically depicted one of the panels 11. The panel 11 has a major upper face 29 and a major lower face 30. The panel 11 is machined at each end so as to be chamfered, thereby providing a leading edge face 31 and a trailing edge face 32. The leading edge face 31 intersects with the major face 30 so as to provide a leading edge 33, with the face 31 intersecting the face 30 at an acute angle. The trailing edge face 32 is parallel to the face 31 and intersects with the major face 29 so as to provide a trailing edge 34. The trailing edge face 32 intersects with the major face 29 at the same acute angle, mentioned previously, with respect to the faces 31 and 32. The surfaces 31 and 32 intersect the faces 29 and 30 so as to provide ridges 35 and 36 whereat obtuse angles are defined.

When the panels 11 are delivered to the adhesive applicator station 20, the leading edge face 31 is located beneath the applicator head 23. Thereafter, the applicator head 23 is moved across the conveyor 18, depositing on the face 31 a glue line. Thereafter, the conveyor 18 is actuated to move the panel 11 to the clamp assembly 24.

The clamp assembly 24 includes a base clamp member 37 above which there is located two movable clamp members 38 and 39. The leading panel 11A is positioned so that the trailing ridge 36 is located at or adjacent the rear edge 40 of the movable press member 38. The leading panel 11A, and the trailing panel 11B are sequentially moved by means of driven roller pairs 41 and 42.

In order to provide the strip 25 with a smooth undersurface, the leading edge 33 of the trailing panel 11B, must be located as close as possible to the trailing ridge 38 of the leading panel 11A. In order to achieve this, it was found that the trailing edge 38 had to be positioned accurately relative to the clamp member 38, as discussed previously. Since the ridge 38 is difficult to detect, the positioning of the ridge 38 is difficult. To overcome this problem, the trailing edge can be positioned to thereby position the ridge 38. However a further problem is presented in that the sheets 11 are not of a uniform thickness. Accordingly, to locate the ridge 38, by positioning the trailing edge 24, the thickness of each panel 11 must be determined. Accordingly given the thickness of each panel 11, and the acute angle 43, the horizontal distance between the trailing edge 24 and the trailing ridge 38 can be computed. Once this is achieved, the leading panel 11A can be driven so as to position the trailing edge 24 such that the trailing ridge 38 is located at or adjacently below the rear edge 40 of the press member 38.

Once the trailing ridge 38 is positioned, the clamp member 38 is activated so as to fix the leading sheet 11A in position. Thereafter, the driven rollers 42 are actuated to bring the trailing sheet 11B into contact with the leading panel 11A. That is, the trailing edge face 32 is abutted by the leading edge face 31 of the trailing sheet 11B. The rollers 42 are driven by a constant torque motor or transmission apparatus so as to "drive home" the leading edge 33 of the trailing sheet 11B. The force applied to the trailing sheet 11B is adjusted so that there is just sufficient force to bring the leading edge 33 of the trailing panel 11B into register with the trailing ridge 38 of the leading panel 11A. Thereafter, the clamp member 39 is actuated to bring the abutting faces 31 and 32 into a forced contact to at least partly set the adhesive located therebetween. Thereafter, the scarf joint formed is moved to the further clamp assembly 26 whereat a press member is applied directly to the scarf joint.

A signal indicative of the thickness of each successive sheet may be measured by a suitable conventional thickness sensor, while the trailing edge 34 of each successive panel 11, can be positioned relative to the rear edge 40, by use of optic or pneumatic sensors. For example, if an optic sensor is employed an array of light sensitive diodes would be positioned to detect the position of the rear edge 34.

The thickness of each panel 11 would be delivered to a computer whereat a signal would be generated to control the roller pair 41. The roller pair 41 would then position the rear edge 34 with the aid of the above discussed sensors.

What we claim is:

1. A method of joining panels including the steps of: providing a plurality of panels each with two major parallel surfaces, with each panel having a pair of parallel bevelled edge faces, said edge faces intersecting the major surfaces of the panel, at a predetermined acute angle, so as to provide two generally parallel edges, and at a predetermined obtuse angle, so as to provide two generally parallel ridges;

apply adhesive to the edge faces;

moving the panels successively along a predetermined path with the edge faces transverse of said path, so that adjacent edge faces of an adjacent leading and trailing panel are parallel and facing in opposite directions;

measuring the thickness of the leading panel and providing a signal indicative thereof;

using said signal to compute the position of the trailing ridge of the leading panel relative to its trailing edge;

locating the trailing ridge of the leading panel at the predetermined position by positioning the trailing edge of the leading panel;

applying a clamping force to said leading panel at or adjacent the trailing ridge thereof when at said predetermined position; and moving said trailing panel into contact with said leading panel while being subjected to clamping force, to abut the leading face of the trailing panel with the trailing face of the leading the trailing panel with the trailing face of the leading panel so as to secure the abutted faces together.

2. The method of claim 1 further including the step of applying a clamping force to the trailing panel adjacent the leading edge thereof after the leading edge face of the trailing panel is abutting the trailing edge face of the leading panel.

3. The method of claim 2 further including the step of applying a further clamping force to each joint, which further clamping force extends across the trailing ridge and leading edge of each joint.

4. The method of claim 3 further including severing discrete lengths from a strip formed by successively joining said panels.

5. An apparatus to join panels, with each panel having a pair of parallel major surfaces and a pair of parallel bevelled edge faces, said edge faces intersecting the major surfaces of the panel at the predetermined acute angle, so as to provide two generally parallel edges, and at the predetermined obtuse angle, so as to provide two generally parallel ridges, said apparatus comprising:

means to apply adhesive to the edge faces;

means to move the panels successive along a predetermined path with the edge faces transverse of said path, so that adjacent edge faces of an adjacent leading and trailing panel are parallel and facing in opposite directions;

means to measure the thickness of the leading panel and to provide a signal indicative of said thickness;

means to receive said signal and to compute the position of the trailing ridge of the trailing ridge of the leading panel relative to its trailing edge;

means to locate the trailing edge of the leading panel at a predetermined position by positioning the trailing edge of the leading panel;

means to apply a clamping force to said leading at or adjacent the leading ridge thereof when at said predetermined position;

means to move the trailing panel into contact with said leading panel while being subjected to said clamping force, to abut the leading face of the abutted faces together.

6. The apparatus of claim 5 wherein the means to apply a clamping force to the leading panel includes a stationary clamp member, and a movable clamp member movable from a retracted position spaced from the leading panel, to a clamping position engaging the leading panel; and said apparatus further includes a further clamp member to apply a clamping force to the trailing panel at or adjacent the leading ridge thereof.

7. The apparatus of claim 6 further including means to apply a clamping force to the abutted faces to further aid in securing the abutted faces together.

* * * * *